(12) United States Patent
Kim et al.

(10) Patent No.: US 10,199,883 B2
(45) Date of Patent: Feb. 5, 2019

(54) POWER SUPPLY APPARATUS AND METHOD FOR WIRELESS POWER TRANSMISSION

(71) Applicant: SAMSUNG ELECTRONICS CO., LTD., Suwon-si (KR)

(72) Inventors: Nam Yun Kim, Seoul (KR); Sang Wook Kwon, Seongnam-si (KR); Yun Kwon Park, Dongducheon-si (KR); Jin Sung Choi, Gimpo-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/177,732

(22) Filed: Jun. 9, 2016

(65) Prior Publication Data

US 2016/0294226 A1    Oct. 6, 2016

Related U.S. Application Data

(63) Continuation of application No. 13/486,005, filed on Jun. 1, 2012, now Pat. No. 9,369,007.

(30) Foreign Application Priority Data

Jun. 2, 2011 (KR) .................. 10-2011-0053190

(51) Int. Cl.
*H02J 50/00* (2016.01)
*H02J 50/70* (2016.01)
(Continued)

(52) U.S. Cl.
CPC ............ *H02J 50/70* (2016.02); *B60L 11/182* (2013.01); *B60L 11/1833* (2013.01); *H02J 5/005* (2013.01); *H02J 7/025* (2013.01); *H02J 17/00* (2013.01); *H02J 50/12* (2016.02); *H02J 50/80* (2016.02); *B60L 2210/10* (2013.01); *B60L 2210/30* (2013.01); *B60L 2210/40* (2013.01);
(Continued)

(58) Field of Classification Search
CPC .................. H02J 17/00; H02J 50/00
USPC ........................................ 307/104
See application file for complete search history.

(56) References Cited

U.S. PATENT DOCUMENTS

2002/0089315 A1    7/2002  Shi et al.
2003/0201834 A1   10/2003  Pehlke
(Continued)

FOREIGN PATENT DOCUMENTS

JP   2010-514281 A    4/2010
KR   2001-0066453 A    7/2001
(Continued)

*Primary Examiner* — Rexford Barnie
*Assistant Examiner* — Joseph Inge
(74) *Attorney, Agent, or Firm* — Sughrue Mion, PLLC

(57) ABSTRACT

Provided is an apparatus and method that may stably perform wireless transmission. According to one general aspect, a power supply for a wireless power transmitter may include: a detecting unit configured to detect voltage, current, or both supplied to a power amplifier (PA); a controller configured to determine power supplied to the PA based on the detected voltage, the detected current, or both, and to determine a reference current based on the determined power supplied to the PA; and a breaker configured to cut off the power supplied to the PA based on a comparison of current supplied to the PA and the reference current.

19 Claims, 9 Drawing Sheets

(51) Int. Cl.
    *H02J 50/12*    (2016.01)
    *H02J 17/00*    (2006.01)
    *H02J 5/00*    (2016.01)
    *H02J 7/02*    (2016.01)
    *B60L 11/18*    (2006.01)
    *H02J 50/80*    (2016.01)

(52) U.S. Cl.
    CPC ........ *B60L 2250/16* (2013.01); *Y02T 10/7005* (2013.01); *Y02T 10/7072* (2013.01); *Y02T 10/7216* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(56)    References Cited

U.S. PATENT DOCUMENTS

| | | | |
|---|---|---|---|
| 2007/0021140 A1* | 1/2007 | Keyes, IV | H02J 17/00 455/522 |
| 2009/0127937 A1 | 5/2009 | Widmer et al. | |
| 2009/0243397 A1 | 10/2009 | Cook et al. | |
| 2009/0284082 A1 | 11/2009 | Mohammadian | |
| 2010/0072825 A1* | 3/2010 | Azancot | H02J 5/005 307/104 |
| 2010/0110597 A1* | 5/2010 | Sun | H02H 3/006 361/87 |
| 2010/0181843 A1 | 7/2010 | Schatz et al. | |
| 2010/0181961 A1* | 7/2010 | Novak | H02J 7/025 320/108 |
| 2010/0194206 A1 | 8/2010 | Burdo et al. | |
| 2011/0124305 A1* | 5/2011 | Von Novak | H02J 7/025 455/127.2 |
| 2011/0294440 A1 | 12/2011 | Ishino | |
| 2012/0025624 A1* | 2/2012 | Lee | H02J 7/025 307/104 |
| 2012/0153742 A1 | 6/2012 | Lee et al. | |

FOREIGN PATENT DOCUMENTS

| | | |
|---|---|---|
| KR | 10-2006-0080290 A | 7/2006 |
| KR | 10-2007-0104777 A | 10/2007 |
| KR | 20-2010-0010649 U | 10/2010 |

* cited by examiner

| Vs [V] | Ir [A] | P [dbm] |
|---|---|---|
| 15 | 1.733 | 43.64 |
| 14 | 1.614 | 43.05 |
| 13 | 1.497 | 42.41 |
| 12 | 1.381 | 41.73 |
| 11 | 1.267 | 40.99 |
| 10 | 1.153 | 40.17 |
| 9 | 1.038 | 39.26 |
| 8 | 0.923 | 38.24 |
| 7 | 0.809 | 37.1 |
| 6 | 0.693 | 35.76 |
| 5 | 0.576 | 34.16 |
| 4 | 0.46 | 32.2 |
| 3 | 0.346 | 29.67 |

→ INPUT CURRENT
⇢ INDUCED CURRENT

→ INPUT CURRENT
--→ INDUCED CURRENT

POWER SUPPLY APPARATUS AND METHOD FOR WIRELESS POWER TRANSMISSION

CROSS-REFERENCE TO RELATED APPLICATION(S)

This application is a continuation of U.S. patent application Ser. No. 13/486,005 filed on Jun. 1, 2012, which claims the benefit under 35 U.S.C. § 119(a) of Korean Patent Application No. 10-2011-0053190, filed on Jun. 2, 2011, in the Korean Intellectual Property Office, the entire disclosure of which is incorporated herein by reference for all purposes.

BACKGROUND

1. Field

The following description relates to wireless power transmission.

2. Description of Related Art

As demand for portable electronic devices has rapidly increased, use of wired power supplies for these devices has become more inconvenient. Studies on wireless power transmission have been conducted to overcome inconveniences of wired power supplies and the limited capacity of conventional batteries. One conventional wireless power transmission technology uses a resonance characteristic of a radio frequency (RF) device that may include a source that supplies power and a target that receives power.

SUMMARY

According to one general aspect, a power supply for a wireless power transmitter may include: a detecting unit configured to detect voltage, current, or both supplied to a power amplifier (PA); a controller configured to determine power supplied to the PA based on the detected voltage, the detected current, or both, and to determine a reference current based on the determined power supplied to the PA; and a breaker configured to cut off the power supplied to the PA based on a comparison of current supplied to the PA and the reference current.

The detecting unit may measure voltage across a resistor or a transistor connected to the PA, measures current flowing through the resistor or the transistor, or both.

The detecting unit may measure voltage across a resistor having a predetermined resistance connected to the PA, and determines the current based on the predetermined resistance and the measured voltage.

The controller may determine the reference current using a reference table in which reference currents, predetermined supply powers, and supply voltages, are provided.

The controller may control a signal input to the PA based on the comparison.

The controller may control power output from a power converter that provides supply power to the PA based on the comparison.

The power supply may further include: a comparing unit configured to compare the detected current and the reference current.

The breaker may determine the state of a switch that connects the PA and a power converter based on the comparison.

The breaker may determine an operation of a transistor that connects the PA and a power converter based on the comparison.

The power supply may further include: a leakage current breaker configured to cut off a leakage current.

The power supply may further include: a source resonance unit configured to transmit power output from the PA; and a matching network configured to match an output impedance of the PA and an input impedance of the source resonator.

According to another general aspect, a power supply method for wireless power transmission may include: detecting voltage, current, or both, supplied to a power amplifier (PA); determining power supplied to the PA based on the detected voltage, the detected current, or both; determining a reference current based on the determined power supplied to the PA; and cutting off the power supplied to the PA based on a comparison between current supplied to the PA and the reference current.

The detecting may include: measuring voltage across a resistor or a transistor connected to the PA, measuring current flowing through the resistor or the transistor, or both.

The detecting may include: measuring voltage across a resistor having a predetermined resistance connected to the PA; and determining the current based on the predetermined resistance and the measured voltage.

The method may further include: controlling power output from a power converter that provides power to the PA based on the comparison.

The method may further include: comparing the detected current and the reference current.

The cutting off may include: cutting off an electrical connection between the PA and the power converter based on the comparison.

According to yet another general aspect, a wireless power transmitter may include the aforementioned power supply.

Other features and aspects may be apparent from the following detailed description, the drawings, and the claims.

Figure 1:
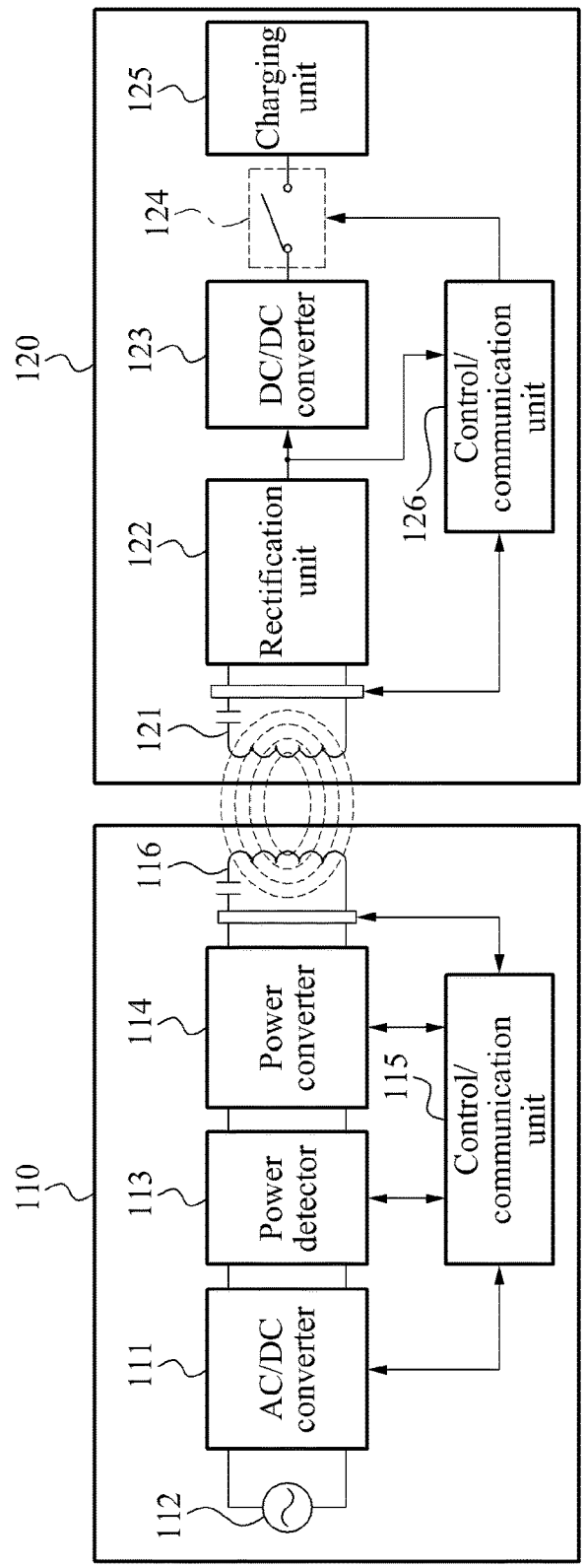
FIG. 1 is a diagram illustrating a wireless power transmission system.

Throughout the drawings and the detailed description, unless otherwise described, the same drawing reference numerals should be understood to refer to the same elements, features, and structures. The relative sizes and depictions of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein may be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 illustrates a wireless power transmission system.

Referring to FIG. 1, the wireless power transmission system includes a source device 110 and a target device 120. The source device 110 may correspond to a device supplying wireless power and may include various electric devices that supply power, such as pads, terminals, televisions (TVs), and the like. The target device 120 may correspond to a device receiving wireless power, and may include an assorted range of electronic devices that consume power, such as terminals, TVs, vehicles, washing machines, radios, lights and the like.

The source device 110 may include an alternating current-to-direct current (AC/DC) converter 111, a power detector 113, a power converter 114, a control/communication unit 115, and a source resonator 116.

The target device 120 may include a target resonator 121, a rectification unit 122, a DC-to-DC (DC/DC) converter 123, a switch unit 124, a charging unit 125, and a control/communication unit 126.

The AC/DC converter 111 may generate DC voltage by converting AC voltage output from a power supply 112. The AC/DC converter 111 may output DC voltage of a predetermined level, and/or may adjust an output level of DC voltage based on the control of the control/communication unit 115.

The power detector 113 may detect current, voltage, or both, output from the AC/DC converter 111, and may transfer, to the control/communication unit 115, information on the detected current and the detected voltage. Also, the power detector 113 may detect current, voltage, or both input to the power converter 114.

The power converter 114 may generate power by converting DC voltage of a predetermined level to AC voltage, for example, using a switching pulse signal in a band of a few megahertz (MHz) to tens of MHz. The power converter 114 may convert the DC voltage to the AC voltage using a resonance frequency and thus, may generate communication power to be used for communication or charging power to be used for charging used in the target device 120. The communication power to be used for communication may correspond to energy for activating a processor and a communication module of the target device 120 and may be referred to as a wake-up power in terms of the energy for activating the processor and the communication module of the target device 120. For example, the communication power to be used for communication may be transmitted in a form of a constant wave during a predetermined time. The charging power to be used for charging may correspond to energy for charging a battery connected to or included in the target device 120. Moreover, the charging power may be continuously transmitted during a predetermined time, and may be transmitted at a power level greater than the communication power to be used for communication.

The control/communication unit 115 may control the frequency of a switching pulse signal. The frequency of the switching pulse signal may be determined based on the control of the control/communication unit 115. By controlling the power converter 114, the control/communication unit 115 may generate a modulated signal to be transmitted to the target device 120. The control/communication unit 115 may transmit various messages to the target device 120, through in-band communication. The in-band communication may denote communication performed using the same frequency as a resonance frequency used for wireless power transmission. The control/communication unit 115 may detect a reflected wave, and may demodulate a signal received from the target device 120 through an envelope of the detected reflected wave.

The control/communication unit 115 may generate a modulated signal for in-band communication, using various schemes. To generate the modulated signal, the control/communication unit 115 may turn a switching pulse signal ON and OFF, and/or may perform delta-sigma modulation. Additionally, the control/communication unit 115 may generate a pulse-width modulated (PWM) signal having a predetermined envelope.

The control/communication unit 115 may perform out-band communication using a communication channel, as opposed to using the resonance frequency. The control/communication unit 115 may include a communication module, such as one configured to process ZigBee, Bluetooth, Wi-Fi, or Wi-Max communications and the like. The control/communication unit 115 may perform transmission and reception of data with the target device 120, through out-band communication.

The term "in-band" communication(s), as used herein, means communication(s) in which information (such as, for example, control information, data and/or metadata) is transmitted in the same frequency band, and/or on the same channel, as used for power transmission. According to one or more embodiments, the frequency may be a resonance frequency. And, the term "out-band" communication(s), as used herein, means communication(s) in which information (such as, for example, control information, data and/or metadata) is transmitted in a separate frequency band and/or using a separate or dedicated channel, than used for power transmission.

The source resonator 116 may transfer electromagnetic energy to the target resonator 121. For instance, the source resonator 116 may transfer, to the target device 120, a communication power to be used for communication or a charging power to be used for charging through magnetic coupling with the target resonator 121.

The target resonator 121 may receive the electromagnetic energy from the source resonator 116. The target resonator 121 may receive, from the source device 110, the communication power to be used for communication or the charging power to be used for charging through magnetic coupling with the source resonator 116. The target resonator 121 may receive various messages from the source device 110 through in-band communication.

The rectifying unit 122 may generate DC voltage by rectifying AC voltage received by the target resonator 121.

The DC/DC converter 123 may adjust a level of the DC voltage output from the rectifying unit 122 based on a capacity of the charging unit 125. For example, the DC/DC converter 123 may adjust, the level of the DC voltage output from the rectifying unit 122 from 3 Volts (V) to 10 V.

The switch unit 124 may be actuated (e.g., turned ON and OFF) based on the control of the control/communication unit 126. When the switch unit 124 is turned OFF, the control/communication 115 of the source device 110 may detect a reflected wave. Also, when the switch unit 124 is turned OFF, the magnetic coupling between the source resonator 116 and the target resonator 121 may be eliminated.

The charging unit 125 may include at least one battery. The charging unit 125 may be configured to charge the at least one battery using DC voltage output from the DC/DC converter 123.

The control/communication unit 126 may perform in-band communication for transmitting and receiving data using a resonance frequency. For example, the control/communication unit 126 may demodulate a received signal by detecting a signal between the target resonator 121 and the rectifying unit 122, or by detecting an output signal of the rectifying unit 122. The control/communication unit 126 may demodulate a message received through the in-band communication.

The control/communication unit 126 may adjust an impedance of the target resonator 121 so as to modulate a signal to be transmitted to the source device 110. The control/communication unit 126 may modulate the signal to be transmitted to the source device 110, by turning the switch unit 124 ON and OFF. For example, the control/communication unit 126 may increase the impedance of the target resonator 121 so that a reflected wave may be detected from the control/communication unit 115 of the source device 110. Depending on whether the reflected wave is detected, the control/communication unit 115 may detect a binary number (e.g., "0" or "1").

The control/communication unit 126 may perform out-band communication using a communication channel. The control/communication unit 126 may include a communication module, such as one configured to process Zigbee, Bluetooth, Wi-Fi or Wi-Max communications and the like. The control/communication 126 may perform transmission and reception of data with the source device 110.

Figure 2:
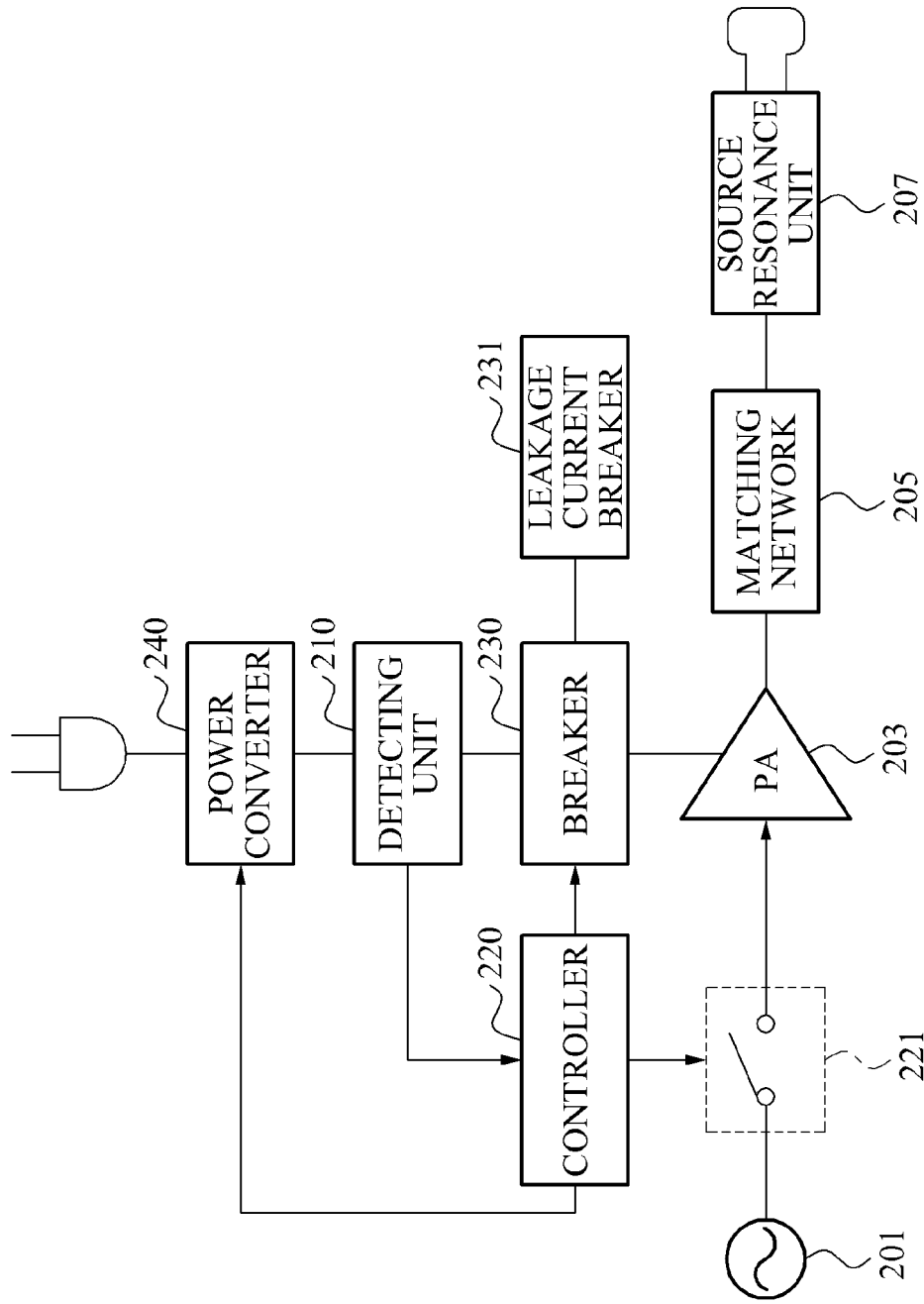
FIG. 2 is a block diagram illustrating a wireless power transmitter.

FIG. 2 illustrates a wireless power transmitter.

In some instance, a load of a target device changes an output power of a power amplifier (PA) may momentarily be out of a stable output range. The stable output range may be a range in which the PA outputs power without causing damage to the PA. Determining that the output power of the PA may be momentarily out of the stable output range, and adjusting the output power to enter the stable output range would be beneficial.

Referring to FIG. 2, the wireless power transmitter includes a frequency generating unit 201, a PA 203, a matching network 205, a source resonance unit 207, a detecting unit 210, a controller 220, a breaker 230, and a power converter 240.

The frequency generating unit 201 may be configured to generate the resonance frequency. The resonance frequency may be determined by a controller 220. The controller 220 may perform impedance matching between a source device and the target device, and may determine a resonance frequency. The power converter 240 may rectify an AC signal input from an external side so as to convert the AC signal to a predetermined DC signal. The power converter 240 may adjust the magnitude of a DC signal based on control of the controller 220. The power converter 240 may increase the magnitude of the DC signal or may decrease the magnitude of the DC signal based on the control of the controller 220. A DC signal output from the power converter 240 may be input to the PA 203 as a supply power, for instance.

An output power of the PA 203 may change based on a load of the target device. The PA 203 may generate an output power satisfying a requested power of the load of the target device. For example, the PA 203 may amplify an input signal based on the supply power where the input signal may be a resonance frequency signal. The supply power may be provided by the power converter 240, based on control of the controller 220. In one or more embodiments, the supply power of the PA 203 may be calculated by measuring a supply voltage, a supply current, or both.

The matching network 205 may match an input impedance shown in a direction from the matching network 205 to the target device and an output impedance of the PA 203. The matching network 205 may match an input impedance of a source resonator and the output impedance of the PA 203. The input impedance may change as the load of the target device changes.

The source resonance unit 207 may be configured to transmit power output from the PA 203 through magnetic coupling between the source resonator and a target resonator. Power may be wirelessly transmitted by an electromagnetic wave propagated by the source resonator. For example, magnetic coupling may be performed based on a resonance frequency between the source resonator and the target resonator. When a relatively high Q-factor exists between the source resonator and the target resonator, the output power of the PA 203 may be effectively transferred to the target resonator.

The detecting unit 210 may be configured to detect the supply voltage or the supply current of the PA 203. The supply power may be generated by the power converter 240. In this example, the supply power may be calculated based on the supply voltage and the supply current. In some implementations, the power converter 240 may be configured as a switching mode power supply (SMPS). When the load of the target device changes, the controller 220 may control the matching network 205 to match the output impedance and the input impedance that vary due to the change in the load of the target device. The controller 220 may control the output power of the PA 203 to satisfy the requested power level of the load of the target device. The output power of the PA 203 may be determined based on the supply power of the PA 203.

The detecting unit 210 may be configured to detect or measure a voltage across a predetermined resistor connected between the power converter 240 and the PA 203. The detecting unit 210 may determine the current flowing through the predetermined resistor based on a value of the predetermined resistor and the voltage between the both ends of the predetermined resistor. The current flowing through the predetermined resistor may be provided as the supply current of the PA 203. In some embodiments, the detecting unit 210 may directly detect the current flowing through the predetermined resistor. For example, the detecting unit 210 may periodically or continuously detect or measure the voltage between the both ends of the predetermined resistor. The detecting unit 210 may detect the voltage between the both ends of the predetermined resistor for each determined time based on control of the controller 220.

The detecting unit 210 may be configured to detect voltage between the both ends of an ON resistor of a transistor connected between the power converter 240 and the PA 203. The detecting unit 210 may detect a current flowing through the ON resistor based on a resistance value of the ON resistor and the voltage between the both ends of the ON resistor. The current flowing through the ON resistor may be provided as the supply current of the PA 203. The detecting unit 210 may directly detect the current flowing through the ON resistor of the transistor. The detecting unit 210 may detect a voltage between both ends of a line impedance connected between the power converter 240 and the PA 203. The detecting unit 210 may detect current flowing through the line impedance based on a value of the line impedance and the voltage between the both ends of the line impedance. The detecting unit 210 may directly detect or measure the current flowing through the line impedance, in some instances.

The controller 220 may be configured to calculate or determine the supply power based on the supply voltage, the supply current, or both, detected by the detecting unit 210. The controller 220 may determine a reference current based on the supply power and the detected supply voltage. The controller 220 may include a reference table. The reference table may include reference currents matching predetermined supply powers and predetermined supply voltages, in some embodiments. Therefore, the controller 220 may determine the reference current based on the reference table, the calculated supply power, and the detected supply voltage. The reference current may denote a limiting current indicating an operating limit of the PA 203. For example, when current supplied to the PA 203 is greater than the reference current, the PA 203 may malfunction or may stop operating. The reference current may denote a limiting current having a predetermined margin from the operating limit of the PA 203. The controller 220 may determine the reference current based on the supply power, the supply voltage, the supply current data, or any combination thereof, that are statistically collected.

Whether the limiting current indicating the operating limit of the PA 203 is set as the reference current or the limiting current having the predetermined margin from the operating limit of the PA 203 is set as the reference current may be determined in advance or may be changed by a user.

The controller 220 may control a switch 221 based on a comparison of the reference current and the supply current detected by the detecting unit 210. The electrical connection between the frequency generating unit 201 and the PA 203 may be controlled by turning ON and OFF the switch 221. For instance, the controller 220 may turn the switch 221 OFF when the detected supply current is greater than the reference current. The resonance frequency signal generated by the frequency generating unit 201 may be an input to the PA 203. When the input signal is not input to the PA 203, the PA 203 may not output power. The controller 220 may turn the electrical connection between the frequency generating unit 201 and the PA 203 OFF and thus, may prevent the PA 203 from generating an output power that momentarily exceeds the stable output range. The controller 220 may turn the switch 221 ON when the detected supply current is less than or equal to the reference current.

The controller 220 may control the output power of the power converter 240 based on a result of comparison between the detected supply current and the reference current. The output power of the power converter 240 may be provided as the supply power of the PA 203. When the detected supply current is greater than the reference current, the controller 220 may control the power converter 240 to output an amount of power that is less than the existing output power.

Since the output power of the power converter 240 is decreased, the PA 203 may generate an output power within the stable output range. The controller 220 may control the power converter 240 to not output power during a predetermined time.

The breaker 230 may be configured to cut off an electrical connection between the power converter 240 and the PA 203 based on a result of comparison between the supply current detected by the detecting unit 210 and the reference current determined by the controller 220. When the detected supply current is greater than the reference current, the controller 220 may control the breaker 230 to cut off the electrical connection between the power converter 240 and the PA 203. The controller 220 may cut off the electrical connection between the power converter 240 and the PA 203, and may control the power converter 240 so as to output power less than the existing output power.

When the detected supply current is less than or equal to the reference current, the controller 220 may control the breaker 230 so as to maintain the electrical connection between the power converter 240 and the PA 203.

The breaker 230 may cut off the electrical connection between the power converter 240 and the PA 203 based on ON and OFF states of a switch. The breaker 230 may cut off the electrical connection between the power converter 240 and the PA 203 by an operation of a transistor. While current output from the power converter 240 based on control of the controller 220 flows through the transistor, the breaker 230 may be configured to decrease the current by a predetermined value and may provide the decreased current to the PA 203.

A leakage current breaker 231 may cut off a leakage current so that the current output from the power converter 240 is transferred to the PA 203 without the leakage current. The leakage current breaker 231 may include a diode connection on a circuit in some embodiments.

Figure 3:
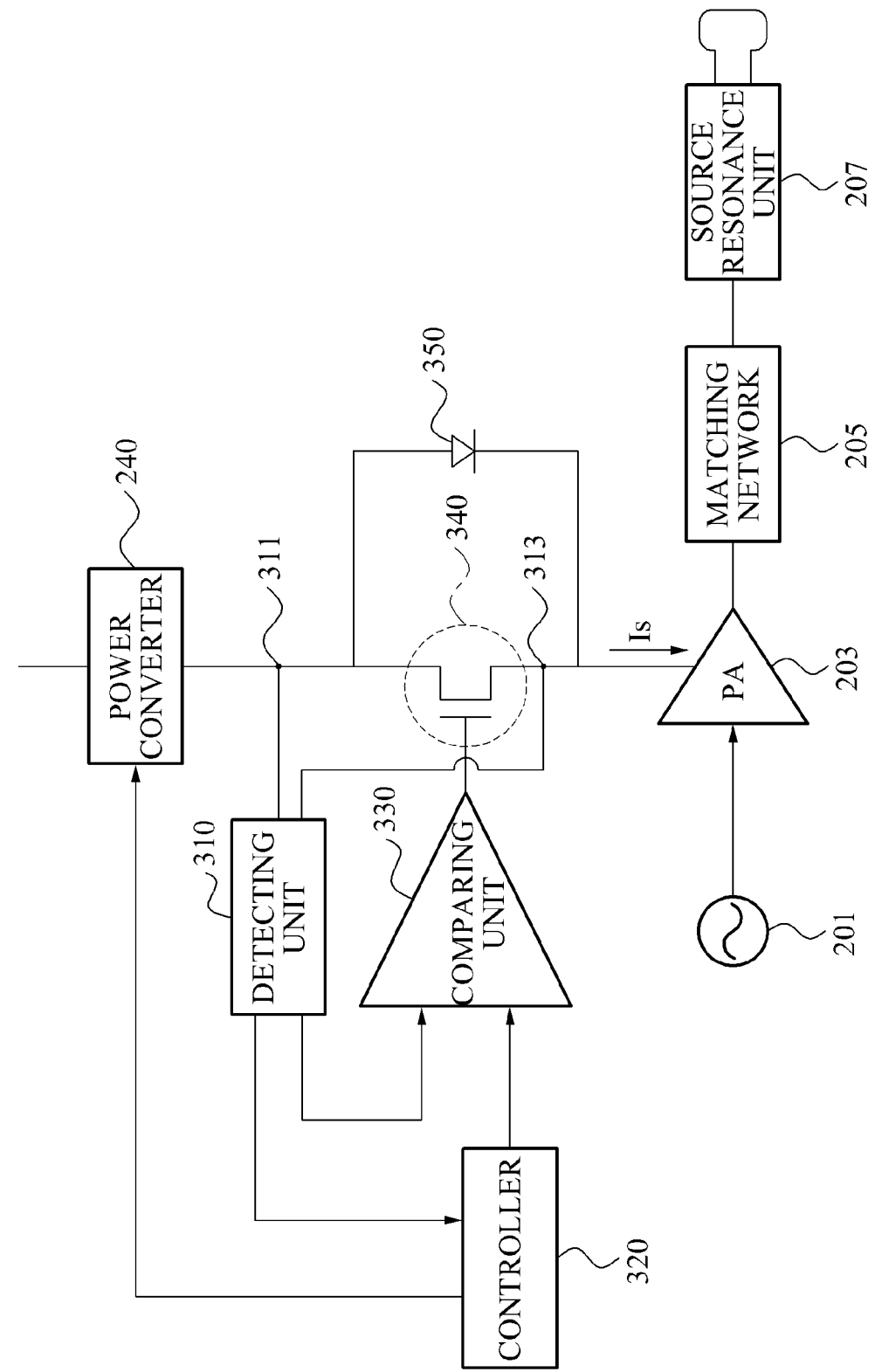
FIG. 3 is a diagram illustrating a wireless power transmitter.

FIG. 3 illustrates a wireless power transmitter.

Referring to FIG. 3, a detecting unit 310 may be configured to detect a voltage between both ends 311 and 313 of the transistor 340. The transistor 340 may include an ON resistor and thus, a voltage may be applied between both ends 311 and 313 of the transistor 340. The controller 320 may store information on the ON resistor of the transistor 340.

The detecting unit 310 may be configured to detect a supply current Is based on the detected voltage and the ON resistor of the transistor 340. For example, the transistor 340 may include various types of transistors, such as, for example, a bipolar junction transistor (BJT), a field effect transistor (FET), an insulated gate bipolar transistor (IGBT), and the like. The supply current Is may be a current that the power converter 240 generates and provides to the PA 203. The detecting unit 310 may provide, to controller 320, information on the detected supply current Is and the detected voltage.

The controller 320 may be configured to calculate a supply power based on the detected voltage and the detected supply current Is. The controller 320 may perform the calculation through a processor. The controller 320 may determine a reference current matching the detected voltage and the calculated supply power, based on a reference table. The controller 320 may transfer the reference to a comparing unit 330.

For example, the controller 320 may compare the determined reference current and the detected supply current, and may control the power converter 240 so as to output an amount of power that is less than the existing output power when the detected supply current is greater than the determined reference current.

The comparing unit 330 may compare the detected supply current and the reference current. In one or more embodiments, the comparing unit 330 may output a "High" value or a "Low" value based on the comparison. The transistor 340 may be controlled based on the output value of the comparing unit 330. For example, when the output value of the comparing unit 330 is the "High" value, the transistor 340 may cut off an electrical connection between the power converter 240 and the PA 203. Conversely, when the output value of the comparing unit 330 is the "Low" value, the transistor 340 may maintain the electrical connection between the power converter 240 and the PA 203.

Additionally, when the output value of the comparing unit 330 is the "High" value, the transistor 340 may maintain the electrical connection between the power converter 240 and the PA 203. And, on the other hand, when the output value of the comparing unit 330 is the "Low" value, the transistor 340 may maintain the electrical connection between the power converter 240 and the PA 203.

The operation of the transistor 340 controlled based on the output value of the comparing unit 330 may be determined in advance or may be determined by a user.

A diode 350 may cut off a leakage current so that a current output from the power converter 240 and supplied to the PA 203 is prevented from leaking. The diode 350 may be connected to a source and a drain of the transistor 340 so as to cut off a leakage current component of the transistor 340.

Figure 4:
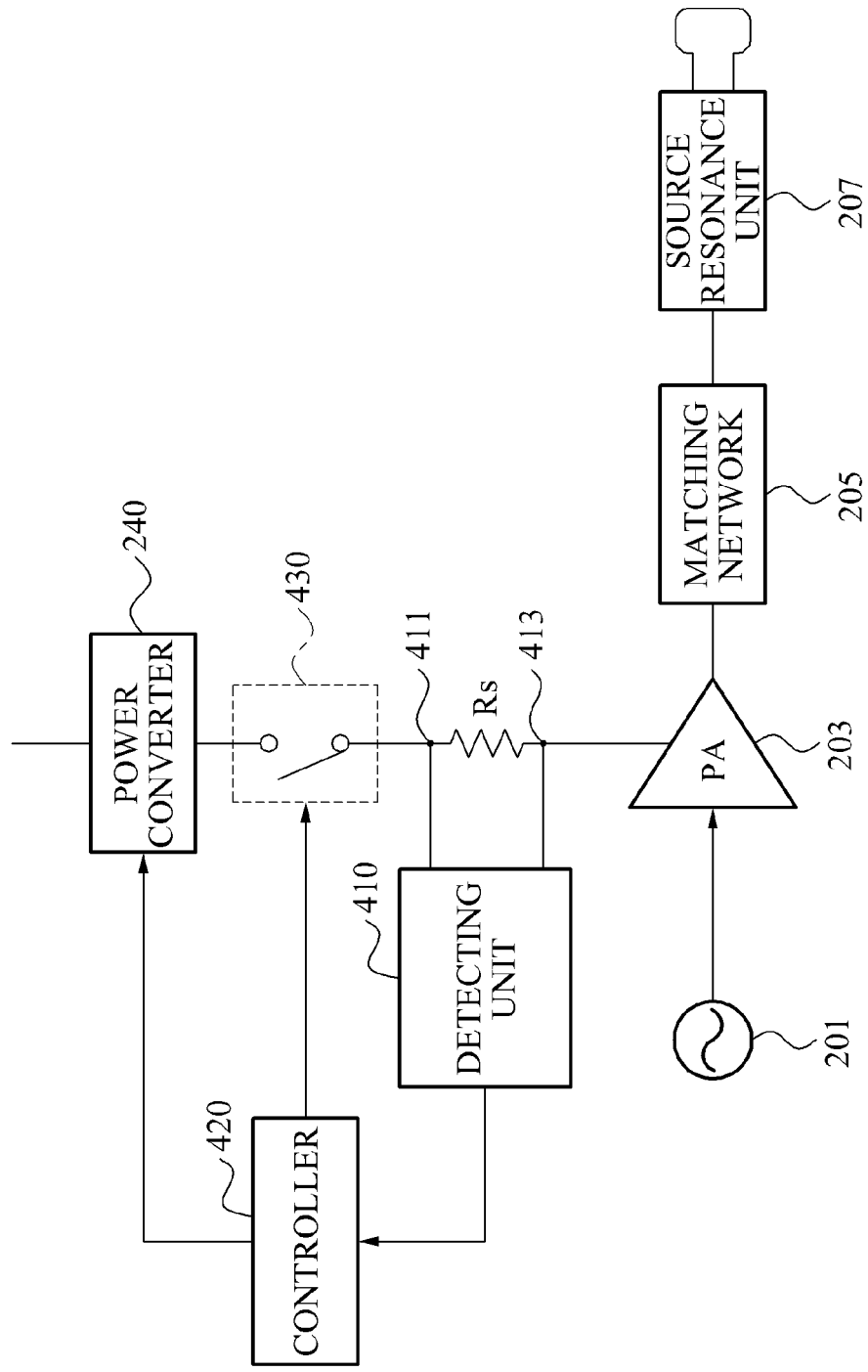
FIG. 4 is a diagram illustrating a wireless power transmitter.

FIG. 4 illustrates a wireless power transmitter.

Referring to FIG. 4, a detecting unit 410 may be configured to detect a voltage applied between both ends 411 and 413 of a resistor Rs. The controller 320 may store information on the resistor Rs.

The detecting unit 410 may detect a supply current, based on the detected voltage and the resistor Rs. The supply current may be a current that the power converter 240 generates and provides to the PA 203. The detecting unit 410 may provide, to the controller 420, information on the detected voltage and the detected supply current.

The controller 420 may calculate the supply power based on the detected voltage and the detected supply current. The controller 420 may perform the calculation through a processor. The controller 420 may determine a reference current that matches the detected voltage and the calculated supply power, based on a reference table. The controller 420 may compare the determined reference current and the detected supply current, and may control an operation of a switch 430 based on a result of the comparison. The switch 430 may include various types of switches, such as, for example, a press button switch, a rotary switch, an electromagnetic switch, a knife switch, a toggle switch, a rocker switch, a slide switch, a touch switch, and the like.

The switch 430 may be configured to "cut off" or terminate an electrical connection between the power converter 240 and the PA 203 based on control of the controller 420. For example, when the detected supply current is greater than the determined reference current, the controller 420 may turn the switch 430 OFF so as to cut off the electrical connection between the power converter 240 and the PA 203. Conversely, when the detected supply current is less than or equal to the reference current, the controller 420 may turn the switch 430 ON so as to maintain the electrical connection between the power converter 240 and the PA 203.

For example, the controller 420 may compare the determined reference current and the detected supply current, and may control the power converter 240 to output an amount of power that is less than the existing output power when the detected supply current is greater than the reference current. For example, when the power converter 240 outputs an amount of power that is less than the existing output power, the controller 430 may turn the switch 430 ON so as to electrically connect the power converter 240 and the PA 203.

The PA 203 may receive, from the power converter 240, a supply current less than a limiting current and thus, may output power within a stable output range. And the PA 203 may output power without a momentary overpower so that a reliability of the wireless power transmitter may increase.

Figures 5, 6:
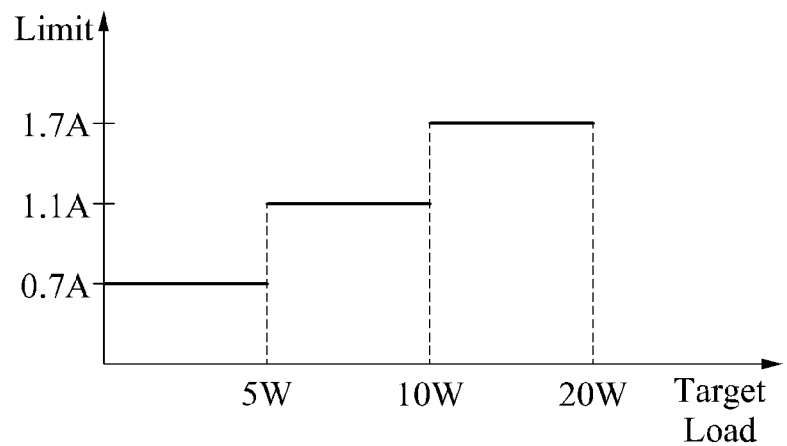
FIG. 5 is a graph illustrating stable ranges of current supplied to one power amplifier (PA).
FIG. 6 is a diagram illustrating a reference table.

FIG. 5 illustrates a stable range of currents supplied to a PA.

The stable range of the currents supplied to the PA may be determined based on a requested power of a load of a target device. A number of target devices that are able to receive wireless power increases, an amount of the requested power of the load of the target device may increase. For example, when a requested power of a single terminal is 5 W and another equivalent terminal is added, the requested power of the load of the target device may increase to 10 W. A limit of a supply current of the PA may be determined based on an amount of an output power of the PA of the source device, for instance.

Referring to FIG. 5, when the requested power of the load of the target device is 5 W, the stable range of the current supplied to the PA may be 0.7 A. When the current supplied to the PA is greater than 0.7 A, the PA may be damaged. Therefore, the supply current may be controlled so that the current supplied to the PA based on the requested power stays within the stable range. Even when the requested power of the load of the target device is 10 W or 20 W, the stable range of the current supplied to the PA may be set.

FIG. 6 illustrates a reference table which may be used when a controller of a wireless power transmitter determines a reference current. A supply voltage Vs of a PA, a supply power P, a reference current Ir may be set in the reference table. The controller may determine the reference current based on the detected supply voltage Vs and the supply power P. For example, when the detected supply voltage Vs is 10 V and the supply power P is 40 dBm, the reference current may be 1.1 A. The wireless power transmitter may be configured to compare the reference current and a detected supply current in order to control the supply power P supplied to the PA.

In some instances, the values set in the reference table may be set by a manufacturer of a product in advance. Alternatively or additionally, the values set in the reference table may be collected or stored in a database by data collection of the wireless power transmitter.

Figure 7A:
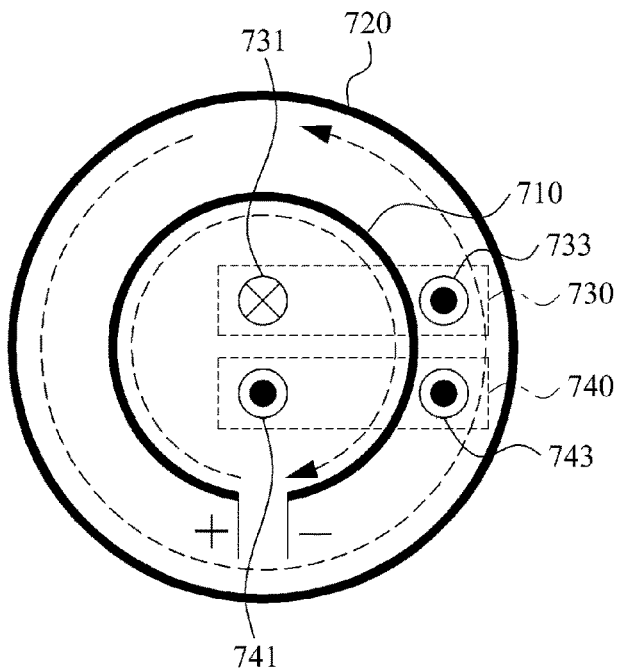
FIGS. 7A and 7B are diagrams illustrating a distribution of a magnetic field in a feeder and a source resonator.
Figure 7B:
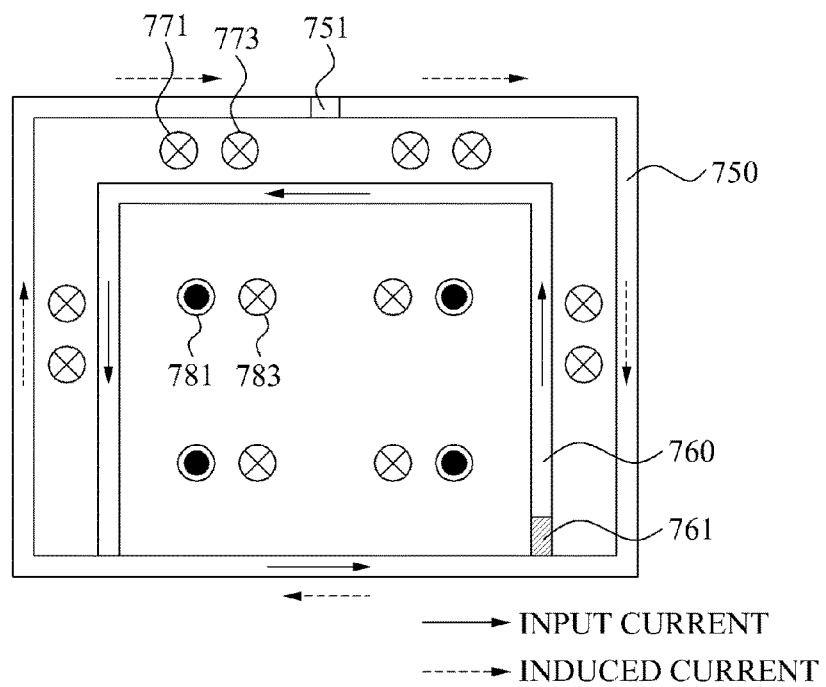

FIGS. 7A and 7B illustrate distribution of a magnetic field in a feeder and a source resonator.

When a source resonator receives power through a separate feeder, magnetic fields may be formed in both the feeder and the source resonator.

Referring to FIG. 7A, as an input current flows in a feeder 710, a magnetic field 730 may be formed. A direction 731 of the magnetic field 730 within the feeder 710 may have a phase opposite to a phase of a direction 733 of the magnetic field 730 outside the feeder 710. An induced current may be formed in a source resonator 720 by the magnetic field 730 formed by the feeder 710. The direction of the induced current may be opposite to a direction of the input current.

Due to the induced current, a magnetic field 740 may be formed in the source resonator 720. Directions of a magnetic field formed due to an induced current in all positions of the source resonator 720 may be identical. Accordingly, a direction 741 of the magnetic field 740 formed within the feeder 710 by the source resonator 720 may have the same phase as a direction 743 of the magnetic field 740 formed outside the feeder 710 by the source resonator 720.

When the magnetic field 730 formed by the feeder 710 and the magnetic field 740 formed by the source resonator 720 are combined, strength of the total magnetic field may decrease within the feeder 710, but may increase outside the feeder 720. When power is supplied to the source resonator 720 through the feeder 710 configured as illustrated in FIG. 7A, the strength of the total magnetic field may decrease in the center of the source resonator 720, but may increase outside the source resonator 720. When a magnetic field is randomly distributed in the source resonator 720, it may be difficult to perform impedance matching, since an input impedance may frequently vary. Additionally, when the strength of the total magnetic field increases, the efficiency of wireless power transmission may increase. Conversely, when the strength of the total magnetic field is decreased, the efficiency of wireless power transmission may be reduced. Accordingly, the power transmission efficiency may be reduced on average.

In a target resonator, a magnetic field may be distributed as illustrated in FIG. 7A. Current flowing in the source resonator 720 may be induced by the input current flowing in the feeder 710 using a magnetic coupling between the source resonator 720 and the target resonator. The current flowing in the target resonator may cause a magnetic field to be formed, so that an induced current may be generated in a feeder located in the target resonator. Within the feeder, the direction of a magnetic field formed by the target resonator may have a phase opposite to a phase of a direction of a magnetic field formed by the feeder and accordingly, strength of the total magnetic field may be reduced.

FIG. 7B illustrates a structure of a wireless power transmitter in which a source resonator 750 and a feeder 760 have a common ground. The source resonator 750 may include a capacitor 751. The feeder 760 may receive an input of a radio frequency (RF) signal via a port 761.

For example, when the RF signal is input to the feeder 760, an input current may be generated in the feeder 760. The input current flowing in the feeder 760 may cause a magnetic field to be formed, and a current may be induced in the source resonator 750 by the magnetic field. Additionally, another magnetic field may be formed due to the induced current flowing in the source resonator 750. A direction of the input current flowing in the feeder 760 may have a phase opposite to a phase of a direction of the induced current flowing in the source resonator 750. Accordingly, in a region between the source resonator 750 and the feeder 760, a direction 771 of the magnetic field formed due to the input current may have the same phase as a direction 773 of the magnetic field formed due to the induced current and thus, the strength of the total magnetic field may increase. Conversely, within the feeder 760, a direction 781 of the magnetic field formed due to the input current may have a phase opposite to a phase of a direction 783 of the magnetic field formed due to the induced current and thus, the strength of the total magnetic field may decrease. Therefore, the strength of the total magnetic field may decrease in the center of the source resonator 750, but may increase outside the source resonator 750.

The feeder 760 may be configured to determine an input impedance by adjusting an internal area of the feeder 760. The input impedance refers to an impedance viewed in a direction from the feeder 760 to the source resonator 750. When the internal area of the feeder 760 increases the input impedance may also be increased. Conversely, when the internal area of the feeder 760 is reduced, the input impedance may also be reduced.

Since the magnetic field is randomly distributed in the source resonator 750 even when the input impedance is reduced, a value of the input impedance may vary depending on a location of a target device. Accordingly, a separate matching network may need to match the input impedance to an output impedance of a PA. For example, when the input impedance increases, a separate matching network may be used to match the increased input impedance to a relatively low output impedance.

As an example, when a target resonator has the same configuration as the source resonator 750, and when a feeder of the target resonator has the same configuration as the feeder 760, a separate matching network may be needed, because a direction of a current flowing in the target resonator has a phase opposite to a phase of a direction of an induced current flowing in the feeder of the target resonator.

Figure 8A:
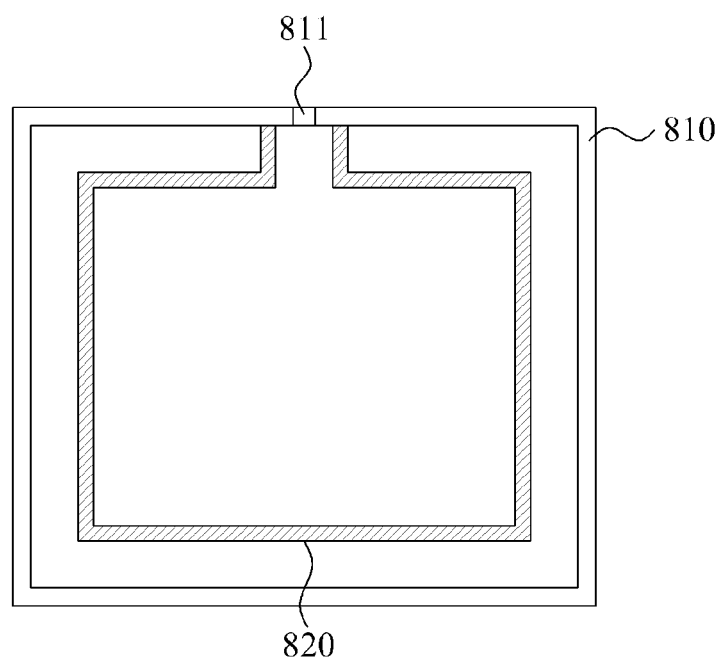
FIGS. 8A and 8B are diagrams illustrating a wireless power transmitter.

FIG. 8A illustrates a wireless power transmitter.

Referring to FIG. 8A, the wireless power transmitter includes a source resonator 810, and a feeding unit 820. The source resonator 810 may include a capacitor 811. The feeding unit 820 may be electrically connected to both ends of the capacitor 811.

Figure 8B:
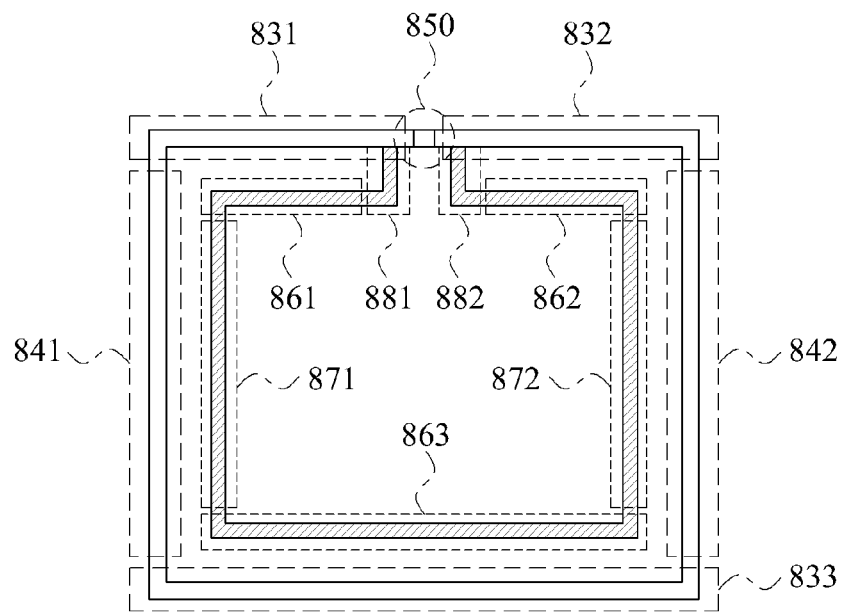

FIG. 8B illustrates, in more detail, the structure of the wireless power transmitter of FIG. 8A. The source resonator 810 includes a first transmission line, a first conductor 841, a second conductor 842, and at least one first capacitor 850.

The first capacitor 850 may be inserted or otherwise positioned in series between a first signal conducting portion 831 and a second signal conducting portion 832 in the first transmission line, and an electric field may be confined within the first capacitor 850. For example, the first transmission line may include at least one conductor in an upper portion of the first transmission line, and may also include at least one conductor in a lower portion of the first transmission line. Current may flow through the at least one conductor disposed in the upper portion of the first transmission line, and the at least one conductor disposed in the lower portion of the first transmission line may be electrically grounded. For example, a conductor disposed in an upper portion of the first transmission line may be separated into and thereby be referred to as the first signal conducting portion 831 and the second signal conducting portion 832. A conductor disposed in a lower portion of the first transmission line may be referred to as a first ground conducting portion 833.

As illustrated in FIG. 8B, the source resonator 810 may have a generally two-dimensional (2D) structure. The first transmission line may include the first signal conducting portion 831 and the second signal conducting portion 832 in the upper portion of the first transmission line. In addition, the first transmission line may include the first ground conducting portion 833 in the lower portion of the first transmission line. The first signal conducting portion 831 and the second signal conducting portion 832 may be disposed to face the first ground conducting portion 833. Current may flow through the first signal conducting portion 831 and the second signal conducting portion 832.

Additionally, one end of the first signal conducting portion 831 may be electrically connected (i.e., shorted) to the first conductor 841, and another end of the first signal conducting portion 831 may be connected to the first capacitor 850. One end of the second signal conducting portion 832 may be shorted to the second conductor 842, and another end of the second signal conducting portion 832 may be connected to the first capacitor 850. Accordingly, the first signal conducting portion 831, the second signal conducting portion 832, the first ground conducting portion 833, and the conductors 841 and 842 may be connected to each other, so that the source resonator 810 may have an electrically closed-loop structure. The term "closed-loop structure"

as used herein, may include a polygonal structure, for example, a circular structure, a rectangular structure, or the like that is a circuit that is electrically closed.

The first capacitor 850 may be inserted into an intermediate portion of the first transmission line. For example, the first capacitor 850 may be inserted into a space between the first signal conducting portion 831 and the second signal conducting portion 832. The first capacitor 850 may be configured as a lumped element, a distributed element, or the like. For example, a distributed capacitor having the shape of the distributed element may include zigzagged conductor lines and a dielectric material that has a high permittivity between the zigzagged conductor lines.

When the first capacitor 850 is inserted into the first transmission line, the source resonator 810 may have a characteristic of a metamaterial. The metamaterial indicates a material having a predetermined electrical property that has not been discovered in nature, and thus, may have an artificially designed structure. An electromagnetic characteristic of the materials existing in nature may have a unique magnetic permeability or a unique permittivity. Most materials may have a positive magnetic permeability or a positive permittivity.

In the case of most materials, a right hand rule may be applied to an electric field, a magnetic field, and a pointing vector, and thus, the corresponding materials may be referred to as right handed materials (RHMs). However, the metamaterial that has a magnetic permeability or a permittivity absent in nature may be classified into an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

When a capacitance of the first capacitor 850 inserted as the lumped element is appropriately determined, the source resonator 810 may have the characteristic of the metamaterial. Because the source resonator 810 may have a negative magnetic permeability by appropriately adjusting the capacitance of the first capacitor 850, the source resonator 810 may also be referred to as an MNG resonator. Various criteria may be applied to determine the capacitance of the first capacitor 850. For example, the various criteria may include a criterion for enabling the source resonator 810 to have the characteristic of the metamaterial, a criterion for enabling the source resonator 810 to have a negative magnetic permeability in a target frequency, a criterion for enabling the source resonator 810 to have a zeroth order resonance characteristic in the target frequency, and the like. Based on at least one criterion among the aforementioned criteria, the capacitance of the first capacitor 850 may be determined.

The source resonator 810, also referred to as the MNG resonator 810, may have a zeroth order resonance characteristic (i.e., having, as a resonance frequency, a frequency when a propagation constant is "0"). Because the source resonator 810 may have a zeroth order resonance characteristic, the resonance frequency may be independent with respect to a physical size of the MNG resonator 810. By appropriately designing or configuring the first capacitor 850, the MNG resonator 810 may sufficiently change the resonance frequency. Accordingly, the physical size of the MNG resonator 810 may not be changed.

In a near field, for example, the electric field may be concentrated on the first capacitor 850 inserted into the first transmission line. Accordingly, due to the first capacitor 850, the magnetic field may become dominant in the near field.

The MNG resonator 810 may have a relatively high Q-factor using the first capacitor 850 of the lumped element, and thus, it may be possible to enhance an efficiency of power transmission. For example, the Q-factor may indicate a level of an ohmic loss or a ratio of a reactance with respect to a resistance in the wireless power transmission. The efficiency of the wireless power transmission may increase according to an increase in the Q-factor.

In one or more embodiments, a magnetic core may be further provided to pass through the MNG resonator 810. The magnetic core may increase power transmission distance.

Referring to FIG. 8B, the feeding unit 820 includes a second transmission line, a third conductor 871, a fourth conductor 872, a fifth conductor 881, and a sixth conductor 882.

The second transmission line may include a third signal conducting portion 861 and a fourth signal conducting portion 862 in an upper portion of the second transmission line. In addition, the second transmission line may include a second ground conducting portion 863 in a lower portion of the second transmission line. The third signal conducting portion 861 and the fourth signal conducting portion 862 may be disposed to face the second ground conducting portion 863, in some instances. Current may flow through the third signal conducting portion 861 and the fourth signal conducting portion 862.

Additionally, one end of the third signal conducting portion 861 may be shorted to the third conductor 871, and another end of the third signal conducting portion 861 may be connected to the fifth conductor 881. One end of the fourth signal conducting portion 862 may be shorted to the fourth conductor 872, and another end of the fourth signal conducting portion 862 may be connected to the sixth conductor 882. The fifth conductor 881 may be connected to the first signal conducting portion 831, and the sixth conductor 882 may be connected to the second signal conducting portion 832. The fifth conductor 881 and the sixth conductor 882 may be connected in parallel to both ends of the first capacitor 850. Moreover, the fifth conductor 881 and the sixth conductor 882 may be used as input ports to receive an input of an RF signal.

Accordingly, the third signal conducting portion 861, the fourth signal conducting portion 862, the second ground conducting portion 863, the third conductor 871, the fourth conductor 872, the fifth conductor 881, the sixth conductor 882, and the source resonator 810 may be connected to each other, so that the source resonator 810 and the feeding unit 820 may have an electrically closed-loop structure. When an RF signal is received via the fifth conductor 881 or the sixth conductor 882, an input current may flow in the feeding unit 820 and the source resonator 810, a magnetic field may be formed due to the input current, and a current may be induced to the source resonator 810 by the formed magnetic field. A direction of the input current flowing in the feeding unit 820 may be identical to a direction of the induced current flowing in the source resonator 810 and thus, strength of the total magnetic field may increase in the center of the source resonator 810, but may decrease outside the source resonator 810. The direction of the input current, and the direction of the induced current will be further described with reference to FIGS. 9A and 9B.

An input impedance may be determined based on an area of a region between the source resonator 810 and the feeding unit 820 and accordingly, a separate matching network used to match the input impedance to an output impedance of a PA may not be needed. For example, even when the matching network is used, the input impedance may be determined by adjusting the size of the feeding unit 820 and thus, a structure of the matching network may be simplified. The simplified structure of the matching network may minimize a matching loss of the matching network.

The second transmission line, the third conductor 871, the fourth conductor 872, the fifth conductor 881, and the sixth conductor 882 may form the same structure as the source resonator 810. When the source resonator 810 has a loop structure, the feeding unit 820 may also have a loop structure. And when the source resonator 810 has a circular structure, the feeding unit 820 may also have a circular structure.

The above-described configuration of the source resonator 810 and configuration of the feeding unit 820 may be applied to the target resonator and the feeding unit of the target resonator, respectively. When the feeding unit of the target resonator is configured as described in the foregoing, the feeding unit may match an output impedance of the target resonator and an input impedance of the feeding unit, by adjusting a size of the feeding unit. Accordingly, a separate matching network may not be used.

Figure 9A:
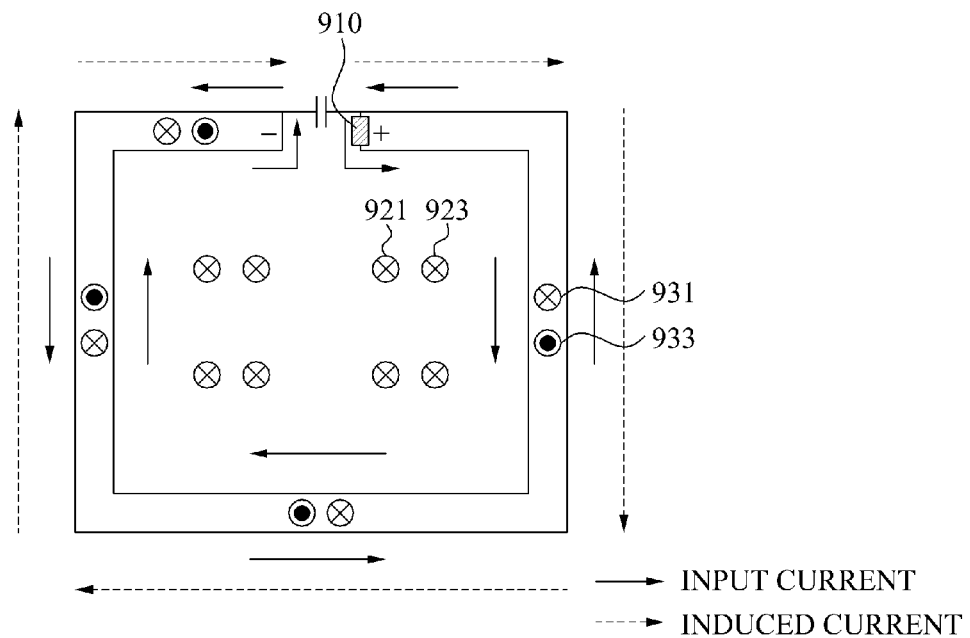
FIG. 9A is a diagram illustrating a distribution of a magnetic field within a source resonator based on feeding of a feeding unit.
Figure 9B:
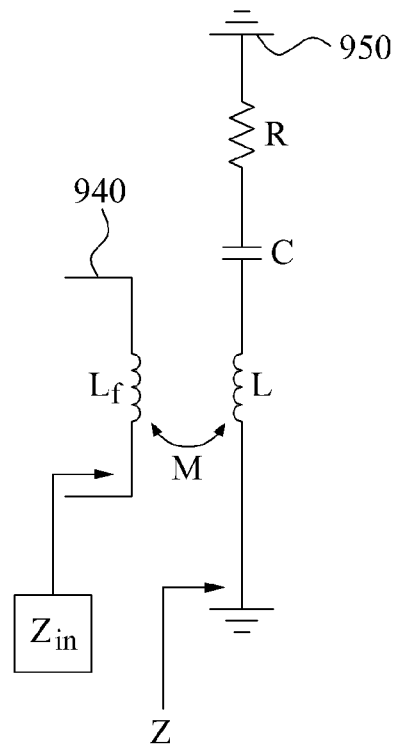
FIG. 9B is a diagram illustrating equivalent circuits of a feeding unit and a source resonator.

FIG. 9A illustrates distribution of a magnetic field within a source resonator based on feeding of a feeding unit. Specifically, FIG. 9A more briefly illustrates the source resonator 810 and the feeding unit 820 of FIG. 8A. FIG. 9B illustrates one equivalent circuit of a feeding unit 940, and an equivalent circuit of a source resonator 950.

A feeding operation may refer to supplying power to a source resonator in a wireless power transmitter, or may refer to supplying AC power to a rectifying unit in a wireless power receiver.

FIG. 9A illustrates a direction of an input current flowing in the feeding unit, and a direction of an induced current induced in the source resonator. Additionally, FIG. 9A illustrates a direction of a magnetic field formed due to the input current of the feeding unit, and a direction of a magnetic field formed due to the induced current of the source resonator.

Referring to FIG. 9A, a fifth conductor or a sixth conductor of the feeding unit may be used as an input port 910. The input port 910 may receive an input of an RF signal. The RF signal may be output from a PA. The PA may increase or decrease the amplitude of the RF signal, on demand by a target device. The RF signal received by the input port 910 may be displayed in the form of an input current flowing in the feeding unit. The input current may flow in a clockwise direction in the feeding unit, along a transmission line of the feeding unit. The fifth conductor of the feeding unit may be electrically connected to the source resonator, such as, for example, to a first signal conducting portion of the source resonator. Accordingly, the input current may flow in the source resonator, as well as, in the feeding unit. The input current may flow in a counterclockwise direction in the source resonator. The input current flowing in the source resonator may cause a magnetic field to be formed, so that an induced current may be generated in the source resonator due to the magnetic field. The induced current may flow in a clockwise direction in the source resonator. And the induced current may transfer energy to a capacitor of the source resonator, and a magnetic field may be formed due to the induced current. The input current flowing in the feeding unit and the source resonator may be indicated by a solid line of FIG. 9A, and the induced current flowing in the source resonator may be indicated by a dotted line of FIG. 9A.

A direction of a magnetic field formed due to a current may be determined based on the right hand rule. As illustrated in FIG. 9A, within the feeding unit, a direction 921 of a magnetic field formed due to the input current flowing in the feeding unit may be identical to a direction 923 of a magnetic field formed due to the induced current flowing in the source resonator. Accordingly, strength of the total magnetic field may increase within the feeding unit.

Additionally, in a region between the feeding unit and the source resonator, a direction 933 of a magnetic field formed dye to the input current flowing in the feeding unit has a phase opposite to a phase of a direction 931 of a magnetic field formed due to the induced current flowing in the source resonator, as illustrated in FIG. 9A. Accordingly, strength of the total magnetic field may decrease in the region between the feeding unit and the source resonator.

Generally, a strength of a magnetic field decreases in the center of a source resonator with the loop structure, and increases outside the source resonator. However, referring to FIG. 9A, the feeding unit may be electrically connected to both ends of a capacitor of the source resonator, and accordingly the induced current of the source resonator may flow in the same direction as the input current of the feeding unit. Since the induced current of the source resonator flows in the same direction as the input current of the feeding unit, the strength of the total magnetic field may increase within the feeding unit, and may decrease outside the feeding unit. As a result, the strength of the total magnetic field may increase in the center of the source resonator with the loop structure, and may decrease outside the source resonator, due to the feeding unit. Thus, the strength of the total magnetic field may be equalized within the source resonator. Additionally, the power transmission efficiency for transferring a power from the source resonator to a target resonator may be in proportion to the strength of the total magnetic field formed in the source resonator. When the strength of the total magnetic field increases in the center of the source resonator, the power transmission efficiency may also increase.

FIG. 9B illustrates equivalent circuits of a feeding unit and a source resonator.

Referring to FIG. 9B, the feeding unit 940 and the source resonator 950 may be expressed by the equivalent circuits. An input impedance $Z_{in}$ viewed in a direction from the feeding unit 940 to the source resonator 950 may be computed of determined using Equation 1.

$$Z_{in} = \frac{(\omega M)^2}{Z} \qquad \text{[Equation 1]}$$

In Equation 1, M denotes a mutual inductance between the feeding unit 940 and the source resonator 950, ω denotes a resonance frequency between the feeding unit 940 and the source resonator 950, and Z denotes an impedance viewed in a direction from the source resonator 950 to a target device. The input impedance $Z_{in}$ may be in proportion to the mutual inductance M. Accordingly, the input impedance $Z_{in}$ may be controlled by adjusting the mutual inductance M. The mutual inductance M may be adjusted based on an area of a region between the feeding unit 940 and the source resonator 950. The area of the region between the feeding unit 940 and the source resonator 950 may be adjusted based on a size of the feeding unit 940. The input impedance $Z_{in}$ may be determined based on the size of the feeding unit 940 and thus, a separate matching network may not need to perform impedance matching with an output impedance of a PA in some instances.

In a target resonator and a feeding unit included in a wireless power receiver, a magnetic field may be distributed as illustrated in FIG. 9A. For example, the target resonator may receive wireless power from a source resonator, using magnetic coupling. Due to the received wireless power, an induced current may be generated in the target resonator. A magnetic field formed due to the induced current in the target resonator may cause another induced current to be generated in the feeding unit. When the target resonator is connected to the feeding unit as illustrated in FIG. 9A, the induced current generated in the target resonator may flow in the same direction as the induced current generated in the feeding unit. Thus, strength of the total magnetic field may increase within the feeding unit, but may decrease in a region between the feeding unit and the target resonator.

Figure 10:
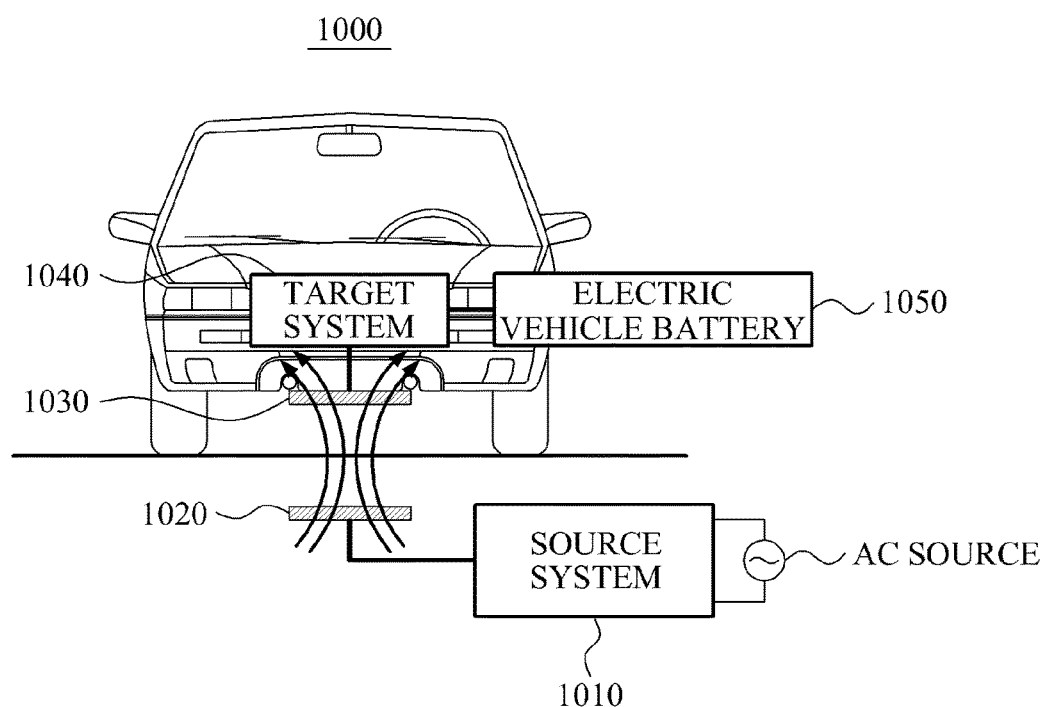
FIG. 10 illustrates an electric vehicle charging system.

FIG. 10 illustrates an electric vehicle charging system.

Referring to FIG. 10, an electric vehicle charging system 1000 includes a source system 1010, a source resonator 1020, a target resonator 1030, a target system 1040, and an electric vehicle battery 1050.

The electric vehicle charging system 1000 may have a similar structure to the wireless power transmission system of FIG. 1. The source system 1010 and the source resonator 1020 in the electric vehicle charging system 1000 may function as a source. Additionally, the target resonator 1030 and the target system 1040 in the electric vehicle charging system 1000 may function as a target.

The source system 1010 may include an alternating current-to-direct current (AC/DC) converter, a power detector, a power converter, a control/communication unit, similarly to the source device of FIG. 1. The target system 1040 may include a rectification unit, a DC-to-DC (DC/DC) converter, a switch unit, a charging unit, and a control/communication unit, similarly to the target device 120 of FIG. 1.

The electric vehicle battery 1050 may be charged by the target system 1040.

The electric vehicle charging system 1000 may use a resonant frequency in a band of a few kilohertz (KHz) to tens of MHz.

The source system 1010 may generate power, based on a type of charging vehicle, a capacity of a battery, and a charging state of a battery, and may supply the generated power to the target system 1040.

The source system 1010 may control the source resonator 1020 and the target resonator 1030 to be aligned. For example, when the source resonator 1020 and the target resonator 1030 are not aligned, the controller of the source system 1010 may transmit a message to the target system 1040, and may control alignment between the source resonator 1020 and the target resonator 1030.

For example, when the target resonator 1030 is not located in a position enabling maximum magnetic resonance, the source resonator 1020 and the target resonator 1030 may not be aligned. When a vehicle does not stop accurately, the source system 1010 may induce a position of the vehicle to be adjusted, and may control the source resonator 1020 and the target resonator 1030 to be aligned.

The source system 1010 and the target system 1040 may transmit or receive an ID of a vehicle, or may exchange various messages, through communication.

The descriptions of FIGS. 2 through 9 may be applied to the electric vehicle charging system 1000. However, the electric vehicle charging system 1000 may use a resonant frequency in a band of a few KHz to tens of MHz, and may transmit power that is equal to or higher than tens of watts to charge the electric vehicle battery 1050.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless power transmitter comprising:
   a communication unit configured to receive information including a requested power from a wireless power receiver;
   a power converter configured to output a supply power supplied to a power amplifier (PA) based on the information;
   a controller configured to determine a reference value based on the information;

a detecting unit configured to detect an electrical value of the supply power to the PA, wherein the electrical value includes at least one of a current and a voltage; and a power switch configured to cut off an electrical connection between the PA and the power converter, based on a comparison of the detected electrical value and the reference value.

2. The wireless power transmitter of claim 1, wherein the detecting unit is configured to measure voltage across a resistor or a transistor connected to the PA, measure current flowing through the resistor or the transistor, or both.

3. The wireless power transmitter of claim 1, wherein the detecting unit is configured to measure voltage across a resistor having a predetermined resistance connected to the PA, and determine the current based on the predetermined resistance and the measured voltage.

4. The wireless power transmitter of claim 1, wherein the controller is configured to determine the reference value using a reference table in which reference values, predetermined supply powers, and corresponding supply voltages, are provided.

5. The wireless power transmitter of claim 1, wherein the controller is configured to control a signal input to the PA based on the comparison.

6. The wireless power transmitter of claim 1, wherein the controller is configured to control the supply power based on the comparison.

7. The wireless power transmitter of claim 1, further comprising:

a comparing unit configured to compare the detected electrical value and the reference value.

8. The wireless power transmitter of claim 1, wherein the power switch is configured to determine a state of a switch that connects the PA and the power converter based on the comparison.

9. The wireless power transmitter of claim 1, wherein the power switch is configured to determine an operation of a transistor that connects the PA and the power converter based on the comparison.

10. The wireless power transmitter of claim 1, further comprising:

a leakage current breaker configured to cut off a leakage current from the power converter.

11. The wireless power transmitter of claim 1, further comprising:

a source resonance unit configured to transmit power output from the PA to the wireless power receiver; and a matching network configured to match an output impedance of the PA and an input impedance of the source resonance unit.

12. A power supply method for wireless power transmission, the method comprising:

receiving information including a requested power from a wireless power receiver;

outputting a supply power supplied to a power amplifier (PA) based on the information;

determining a reference value based on the information;

detecting an electrical value of the supply power to the PA, wherein the electrical value includes at least one of a current and a voltage;

cutting off an electrical connection between the PA and a power converter, based on a comparison of the detected electrical value and the reference value.

13. The method of claim 12, wherein the detecting comprises:

measuring voltage across a resistor or a transistor connected to the PA, measuring current flowing through the resistor or the transistor, or both.

14. The method of claim 12, wherein the detecting comprises:

measuring voltage across a resistor having a predetermined resistance connected to the PA; and determining the current supplied to the PA based on the predetermined resistance and the measured voltage.

15. The method of claim 12, further comprising:
controlling the supply power based on the comparison.

16. The method of claim 12, further comprising:
determining a state of a switch that connects the PA and the power converter based on the comparison.

17. The method of claim 12, further comprising:
transmitting power output from the PA to the wireless power receiver.

18. The method of claim 12, further comprising:
matching an output impedance of the PA and an input impedance of the source resonance unit.

19. The method of claim 12, further comprising:
cutting off a leakage current from the power converter.

* * * * *